United States Patent [19]

Usui

[11] Patent Number: 5,114,250

[45] Date of Patent: May 19, 1992

[54] JOINT FOR COUPLING SMALL-DIAMETER PIPES

[75] Inventor: Masayoshi Usui, Numazu, Japan

[73] Assignee: Usui Kokusai Sangyo Kaisha Ltd., Japan

[21] Appl. No.: 670,993

[22] Filed: Mar. 18, 1991

[30] Foreign Application Priority Data

Mar. 19, 1990 [JP] Japan ............................. 2-27902[U]

[51] Int. Cl.⁵ .............................................. F16L 39/00
[52] U.S. Cl. ...................................... 285/319; 285/921
[58] Field of Search ................................ 285/319, 921

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | VanBilderbeek et al. . |
| 4,219,222 | 8/1980 | Brusadin . |
| 4,275,907 | 6/1981 | Hunt . |
| 4,448,470 | 5/1984 | Peterson ............................. 285/921 |
| 4,451,069 | 5/1984 | Melone . |
| 4,526,411 | 7/1985 | Bartholomew ..................... 285/921 |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,790,567 | 12/1988 | Kawano et al. ..................... 285/921 |
| 4,793,637 | 12/1988 | Laipply et al. . |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |

FOREIGN PATENT DOCUMENTS

| | | |
|---|---|---|
| 2648384 | 6/1977 | Fed. Rep. of Germany ...... 285/319 |
| 593413 | 5/1959 | Italy . |
| 855603 | 12/1960 | United Kingdom . |
| 1145896 | 3/1969 | United Kingdom ................ 285/319 |
| 2222218 | 2/1990 | United Kingdom ................ 285/319 |

Primary Examiner—Eric K. Nicholson
Attorney, Agent, or Firm—Anthony J. Casella; Gerald E. Hespos

[57] ABSTRACT

A joint for coupling small-diameter pipes comprises a body. The body includes a cylindrical joint wall defining a bore and a continuous cylindrical wall defining a stepped enlarged chamber in communication with the bore. The cylindrical wall includes a plurality of rearwardly extending holder walls having pawls. The enlarged chamber is configured to receive a seal and a bushing. A support includes a central hole, and a plurality of holes in surrounding relation to the central hole. When a pipe extends through the central hole, the peripheral wall of the central hole is engaged with an annular projection wall formed adjacent one end of the pipe, and the pawls are engaged with the holes of the support. The support may be in the form of a disk or in the form of a flanged cylindrical member.

5 Claims, 2 Drawing Sheets

PRIOR ART

JOINT FOR COUPLING SMALL-DIAMETER PIPES

BACKGROUND OF THE INVENTION

1. Field of the Invention

The present invention relates to an improvement in a joint designed to couple pipes made of metal or tube made of resin (hereinafter simply referred to as a pipe) which is relatively small in diameter, typically, less than 20 m/m and is adapted to supply oil or gas, for example, to an automotive vehicle or other various machines and instruments.

2. Description of the Related Art

A conventional joint of this type is shown in FIG. 7 and has a body 11. The body 11 includes a cylindrical joint wall 12 defining a bore 14, and a continuous cylindrical wall defining an enlarged chamber 13 in communication with the bore 14. A support wall 11' extends rearwardly from one end of the cylindrical wall. A seal and a bushing are disposed within the enlarged chamber 13. A socket 18 includes a stepped annular wall 18' engaged with the support wall 11'. A plurality of pawls 15 extends forwardly and inwardly from the socket 18 and are inserted into an elongate bore 19 of the cylindrical wall of the body 11. A pipe Po has an annular projection wall Po' located within the enlarged chamber and engaged with the pawls 15.

In the prior art, the stepped annular wall 18' of the socket 18 is engaged with the holder wall 11' of the body 11. At the same time, the pawls 15 of the socket 18 are located within the elongate bore 19 of the cylindrical wall of the body 11. With this arrangement, however, the base 18'' of the pawls are pressed when the socket 18 is fit through the holder wall 11'. This inevitably results in an increase in the diameter of the socket per se and thus, the joint as a whole as well as the length of the joint. Consequently, the joint can not be fit in a small space. In addition, the projection wall must have a large diameter. The long pawls can not otherwise be securely engaged with the projection wall. This causes "settling" and consequent leakage when the joint is subject to vibrations. The joint is thus not effectively operable if used for a prolonged period of time. A further problem with the prior art joint is that engagement of the pawls 15 within the enlarged chamber Po' can not be visually monitored.

SUMMARY OF THE INVENTION

In view of the foregoing, it is an object of the present invention to provide a joint for coupling small-diameter pipes, which can reduces the diameter and size of a body and a support, which is compact so that it may be fit in a small space, which enables safe engagement of holder walls in an enlarged chamber so as to make it possible to reduce the diameter of a projection wall, and which can visually monitor the engagement.

In order to achieve these objects, there is provided a joint for coupling small-diameter pipes, which comprises a a body including a cylindrical joint wall defining a bore and a continuous cylindrical wall defining a stepped enlarged chamber in communication with the bore, the cylindrical wall including a plurality of rearwardly extending holder walls having pawls, and the enlarged chamber being configured to receive a seal and a bushing behind the seal, and a support including a central hole, and a plurality of holes in surrounding relation to the central hole, the central hole including a peripheral wall engaged with an annular projection wall formed adjacent one end of a pipe, and the pawls being engaged with the holes of the support when the pipe extends through the central hole of the support. The support may be in the form of a disk or in the form of a flanged cylindrical member.

A pipe extends through the central hole of the support when the pipe is inserted in place within the enlarged chamber. Under the circumstances, the pawls of the holder walls of the body are engaged with the holes of the support. This arrangement enables easy removal of the pipe from the joint. Since the inner diameter of the central hole is equal to the outer diameter of the pipe, the joint is safely secured to the pipe even if the annular projection wall is small in diameter. This allows the joint body and the support to be small in diameter and size and thus, makes it possible to reduce the size of the product as a whole. In addition, engagement of the support adjacent to the holder walls in the enlarged chamber can be visually monitored.

BRIEF DESCRIPTION OF THE DRAWINGS

For a better understanding of the present invention, reference may be had to the following description of preferred embodiments when taken in conjunction with the accompanying drawings, in which.

DESCRIPTION OF THE PREFERRED EMBODIMENTS

Figure 1:
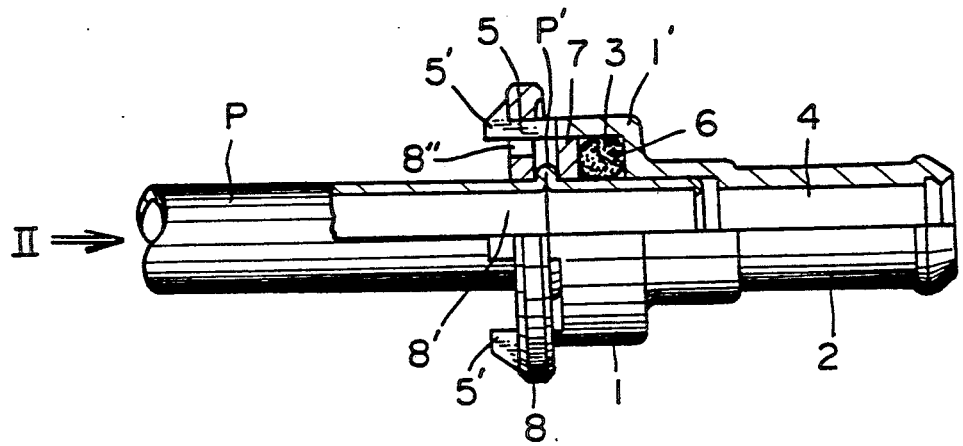
FIG. 1 is a longitudinal sectional view, partly broken away, of a joint for coupling small-diameter pipes, made according to one embodiment of the present invention.
Figure 2:
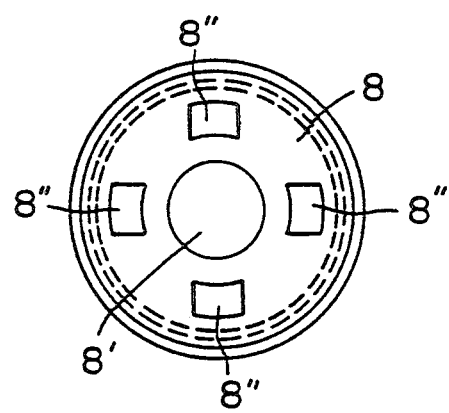
FIG. 2 is a rear view of a support looking in the direction of the arrow II in FIG. 1.
Figure 3:
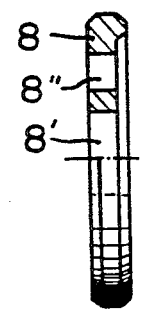
FIG. 3 is a side view, partly in section, of the support of FIG. 2.
Figure 4:
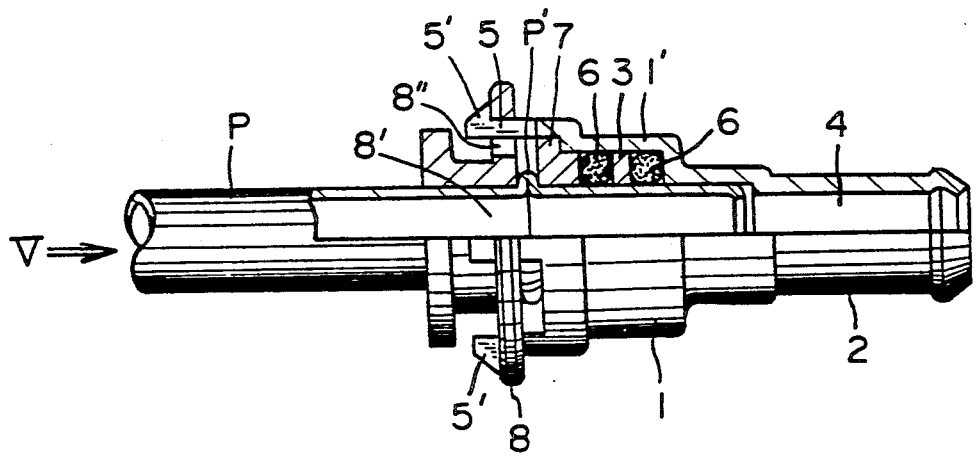
FIG. 4 is a view similiar to FIG. 1, but showing another embodiment of the present invention.
Figure 5:
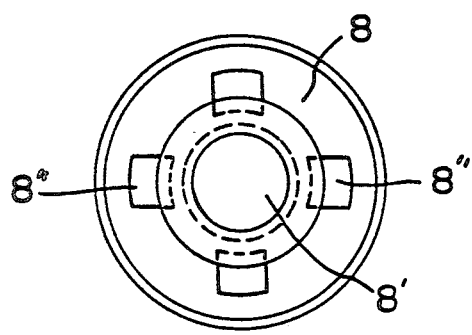
FIG. 5 is a rear view of a support looking in the direction of the arrow V in FIG. 4.
Figure 6:
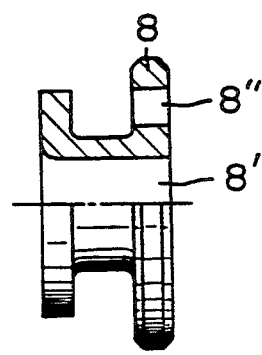
FIG. 6 is a side view, partly in section, of the support of FIG. 5.
Figure 7:
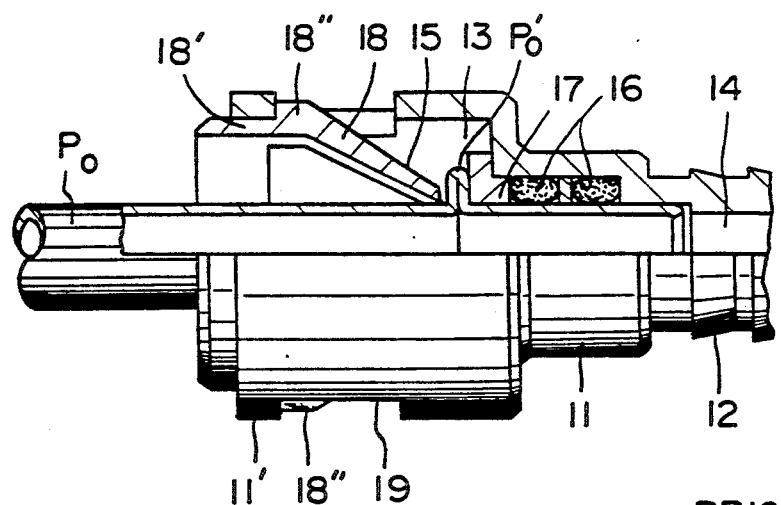
FIG. 7 is a longitudinal sectional view, partly broken away, of a conventional joint, showing the manner in which pipes are coupled by the joint.

With reference to FIGS. 1 and 6, the reference numeral 1 denotes a joint body made of resin or metal. The body 1 includes a cylindrical joint wall 2 at its leading end. The cylindrical joint wall 2 has a bore 4 to receive a tube made of resin or a hose made of rubber (not shown). A continuous cylindrical wall 1' defines a stepped enlarged chamber 3 in communication with the bore 4. A plurality of circumferentially spaced holder walls 5 extend rearwardly from one end of the cylindrical wall 1' and have pawls 5'. A single seal (FIG. 1) or a plurality of seals 6 (FIG. 4), if desirable, are made from a resilient material such as a rubber and disposed within the enlarged chamber. A bushing 7 is also disposed behind the seals 6. The reference numeral 8 denotes a support which includes a central hole 8', the diameter of which being substantially equal to that of a pipe P. The support may be in the form of a disk (FIGS. 2 and 3) or in the form of a flanged cylindrical member (FIGS. 5 and 6). A pipe P has an annular projection wall P' adjacent to its one end. The diameter of the annular projection wall P' is slightly greater than that of the hole 8'. The annular projection wall P' is located within the enlarged chamber 3 when the pipe P is inserted in position. The support 8 includes through holes 8' through which the pawls 5' extend to fit the joint on the pipe P.

With the joint of the present invention thus far described, the pawls 5' of the holder walls 5 extend through the holes 8" of the support 8 whereby the peripheral wall of the hole 8' is forcibly engaged with the projection wall P' of the pipe P. This arrangement can reduce the diameter of the projection wall P' and thus, the body 1 and the support 8 per se and also the length of the body 1 and the thickness of the support 8. Accordingly, the joint can be received in a small space. Engagement of the support 8 adjacent to the holder walls 5 can be visually monitored. The present joint is thus extremely useful.

While preferred embodiments of the present invention have been described in detail, it will be apparent that various changes and modifications may be made therein without departing from the spirit or scope of the invention.

What is claimed is:

1. A joint for a visually monitored coupling for a small-diameter pipe, said pipe having an end and an annular projection wall in proximity to said end, said joint comprising: a body including opposed said front rear ends, a cylindrical joint wall adjacent the front end and defining a bore extending rearwardly from the front end, and a continuous cylindrical chamber wall rearwardly of the joint wall and defining a stepped enlarged chamber in communication with said bore, a plurality of spaced apart holder walls extending rearwardly from the cylindrical chamber wall, said holder walls having pawls at ends thereof remote from the cylindrical chamber wall said enlarged chamber being dimensioned and configured to receive a seal, a bushing and a portion of the pipe extending from the end thereof to the annular projection wall; and a support comprising a disk including a central hole, said pipe being mounted through the central hole in the disk of the support such that the disk is adjacent the annular projection wall of the pipe and on the side thereof opposite the end of the pipe, and a plurality of holes passing through the disk in surrounding relation to the central hole; said pawls being engaged with the holes of the support such that the disk of the support urges the annular projection wall against the bushing in the stepped enlarged chamber of the joint body and retains the pipe in the joint body, whereby the spaced apart rearwardly extending holder walls and the disk of the support enable the coupling to be visually monitored.

2. The joint of claim 1, wherein the body is made of resin.

3. The joint of claim 1, wherein the support consists of the disk.

4. The joint of claim 1, wherein the support is in the form of a flanged cylindrical member, the disk defining a flange at one end of the flanged cylindrical member.

5. The joint of claim 1, wherein the body is made of metal.

* * * * *